April 23, 1946.    J. BAILEY    2,398,876
METHOD OF AND APPARATUS FOR FORMING TUBES OF ORGANIC PLASTIC MATERIAL
Filed Nov. 9, 1944    3 Sheets-Sheet 3
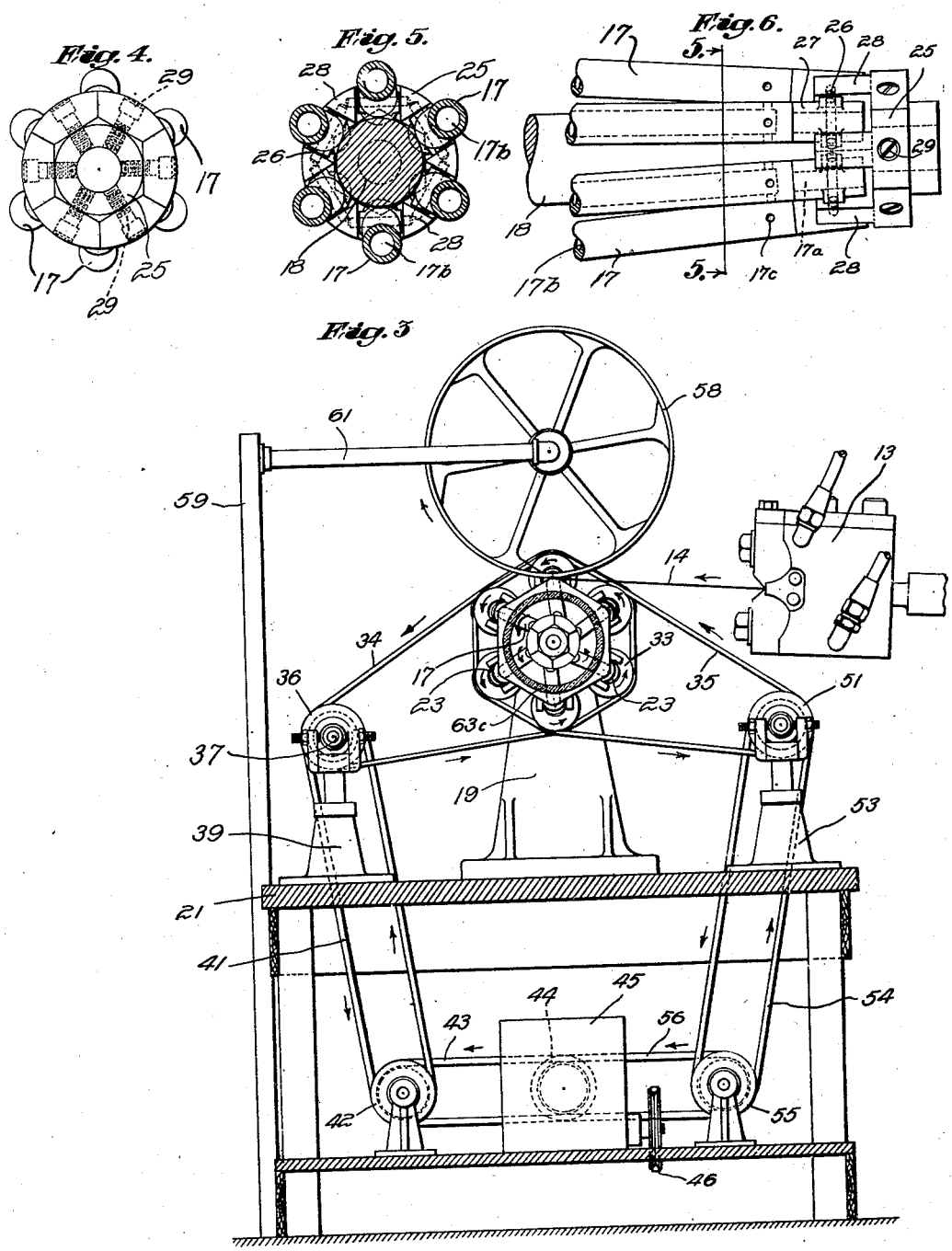

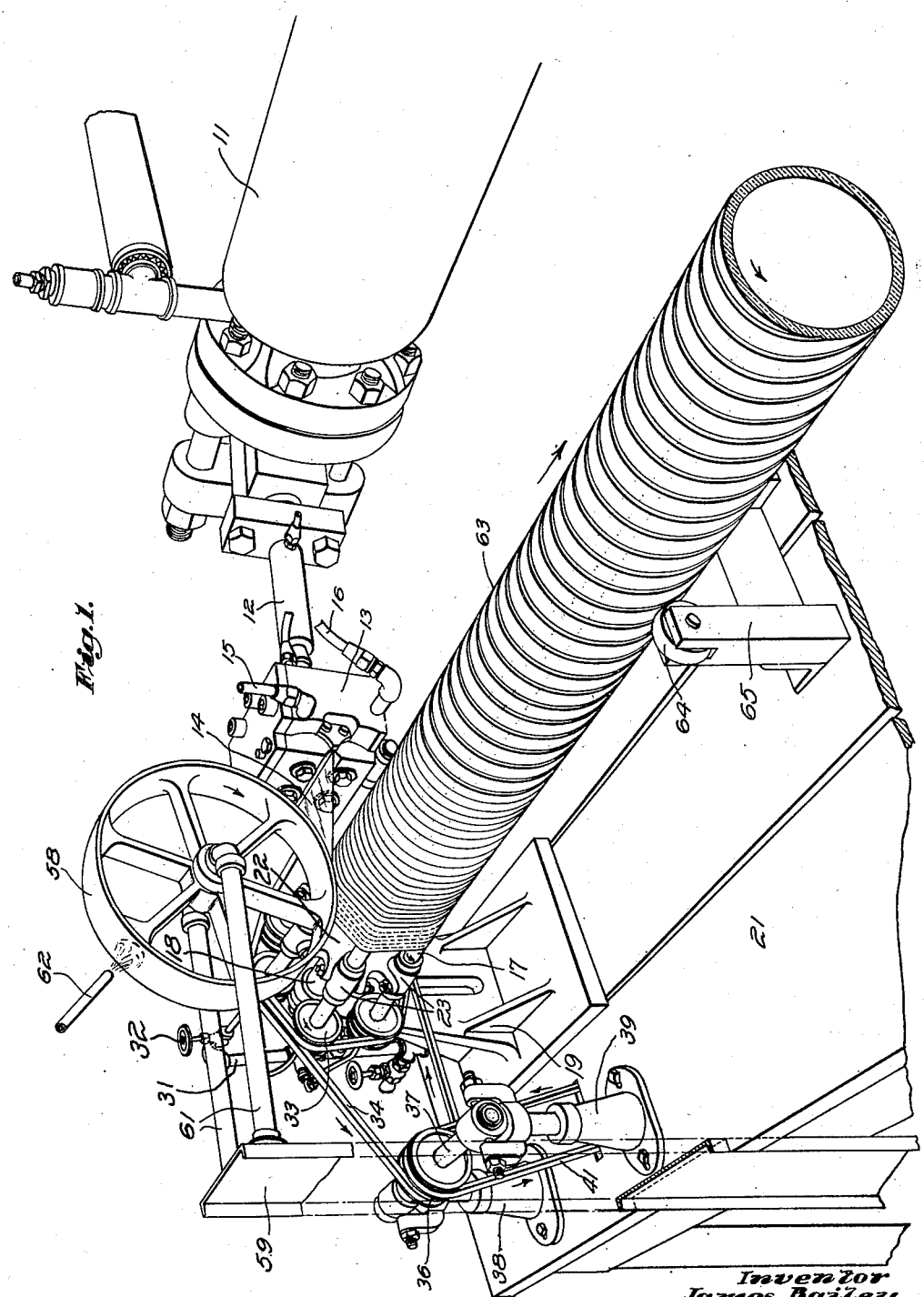

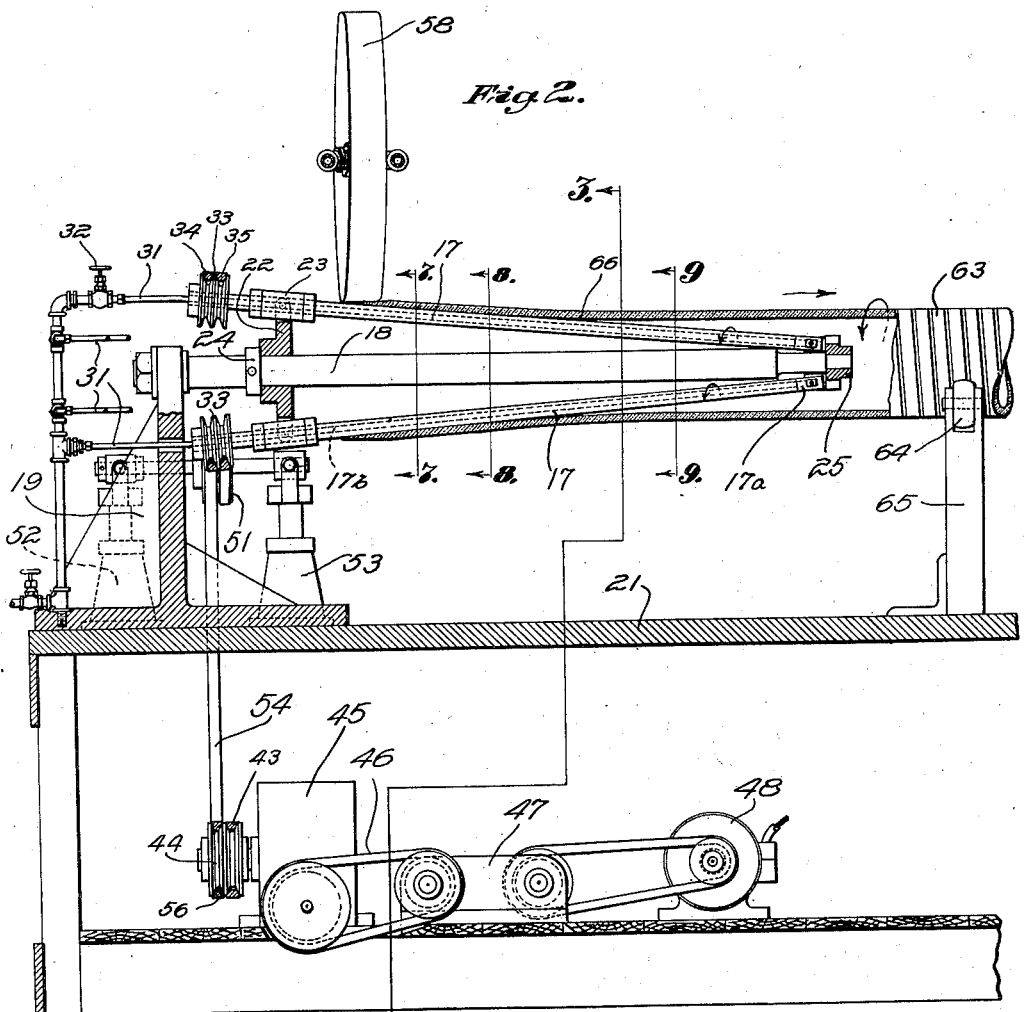
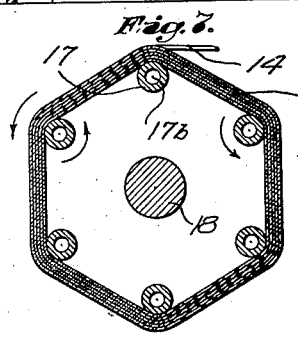
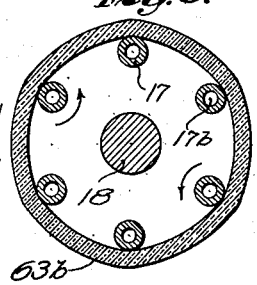
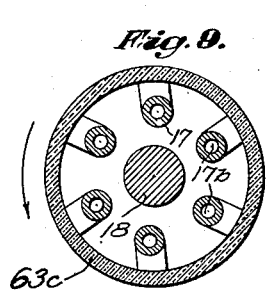

Patented Apr. 23, 1946

2,398,876

UNITED STATES PATENT OFFICE 2,398,876

METHOD OF AND APPARATUS FOR FORMING TUBES OF ORGANIC PLASTIC MATERIAL

James Bailey, West Hartford, Conn., assignor to Plax Corporation, Hartford, Conn., a corporation of Delaware Application November 9, 1944, Serial No. 562,667

10 Claims. (Cl. 18—19)

This invention relates to the production of tubes of organic plastic material and has particular relation to relatively large tubes which are difficult to make by prior methods and apparatus.

The general object of the invention is to provide a novel method and novel apparatus for making tubes of organic plastic material by the employment of which tubes of good strength and otherwise of good quality can be made while obviating such difficulties of prior methods as stripping the tubes from mandrels on which they may be formed. When tubes are formed on mandrels in the usual way, the material shrinks and tightly grips the mandrels and makes removal of the tubes very difficult.

A more specific object of the invention is to provide a novel method of and apparatus for making tubing of organic plastic material wherein and whereby a strip of heat-softened material is spirally wound to form the tube, the strip is welded together to make the wall of the tube integral and non-lamellar and the tube is formed continuously and caused to assume a round shape while it is automatically freed from internal forming means.

A further object of the invention is to form unusually strong tubes or tubing of organic plastic material by wrapping on itself a strip of such material which has been molecularly oriented, the tube thus formed being moved away from the wrapping point and caused to assume a round shape by a partial contraction of the tube due to partial relaxation of the molecular orientation of the strip or ribbon from which it is formed, a substantial amount of the orientation being retained in the tube and making it unusually strong.

It also is an object of the invention to provide a novel method of and novel apparatus for making tubing of organic plastic material by extruding and orienting a strip of the material, spirally wrapping the material on itself and welding it together to a seamless condition, the wrapping operation being performed on an internal former comprising driven rollers arranged at angles to an axis from which the tubing automatically frees itself.

Other objects and advantages of the invention will be pointed out in the detailed description of the embodiment illustrated in the accompanying drawings or will become apparent from the drawings in which:

Figure 1 is a view in perspective of the novel apparatus illustrating the performance of the novel method;

Fig. 2 is a view in vertical longitudinal section of a portion of the apparatus shown in Fig. 1;

Fig. 3 is a view in transverse section taken approximately on the line 3—3 of Fig. 2 looking in the direction of the arrows;

Fig. 4 is an enlarged end view of the internal forming means of Figs. 1 to 3;

Fig. 5 is an enlarged view in transverse section of the internal forming means taken approximately on the line 5—5 of Fig. 6, looking in the direction of the arrows;

Fig. 6 is an enlarged view in side elevation of the end portion of the internal forming means; and Figs. 7, 8 and 9 are views in transverse section taken respectively and approximately on the lines 7—7, 8—8 and 9—9 of Fig. 2 and showing successive steps of the novel method.

Although the strip of oriented organic plastic material may be of any suitable composition and may be delivered in any desired manner, as by heating and stretching a previously formed strip, it is preferred to initially form the strip in carrying out my invention by supplying the material to a suitable stuffer, such as shown at 11, Fig. 1, which may be connected through a heat jacketed passage 12 to a nozzle 13 adapted to extrude a ribbon 14, Figs. 1 and 3. The stuffer 11 may be of the conventional screw type in which the material is heated to working temperature and which serves to force the material through the nozzle 13. The nozzle 13 preferably is heated to the desired temperature, suitably by heating liquid which flows through a jacket (not shown) for the nozzle and to which are connected the pipes 15 and 16 for the liquid circulation.

An example of the type of material which may be used is polystyrene which is capable of being highly oriented by stretching it at the proper temperature and viscosity and at which the orientation is not quickly dissipated. Polystyrene should be heated to a relatively high temperature and brought to a uniform viscosity throughout after which the temperature should be dropped substantially so that when the ribbon is extruded it will be in the desired condition for stretching and for the other operations to be described.

The ribbon 14 is extruded and wrapped around and drawn by internal forming means of novel character and comprising a plurality of rollers 17 which are arranged approximately in the form of a cone about a central shaft 18 which is approximately on the axis of the cone. The number of rollers may be varied. In the illustrated construction, six of such rollers are used spaced equidistantly about the shaft 18 and driven and supported in a manner presently to be described. The number of rollers may be as low as two in some cases and as great as twenty-four in which case they will more closely approximate a cone. Six rollers are a convenient number to form tubing ranging from approximately 3" to 10" in internal diameter. The central shaft 18 about which the rollers 17 are arranged is mounted in a frame 19, Figs. 2 and 3, on table 21. On the shaft 18 is a spider 22 which carries bearings 23 in which the rollers 17 are rotatably mounted near where they are farthest apart, that is, at the rear of the apparatus or left hand end thereof looking at Figs. 1 and 2. The spider 22 may be moved along the shaft 18 to spread the rear ends of the rollers farther apart or to bring them closer together and thus increase or decrease the angle between each roller and the shaft 18 or the approximate axis of the cone. A collar 24 on the shaft 18 may serve to hold the spider and rollers in adjusted position.

Such adjustment of the rollers is made possible by so connecting the ends of them together at the small end of the cone which they form that they can swing inwardly and outwardly of shaft 18 while they are left free to rotate. The provision for this is best shown in Figs. 4, 5 and 6 from which it will be seen that a spider 25 is mounted on the end of the shaft 18 and has pivoted thereon at 26 bearings 27 which receive reduced ends 17a of the rollers 17. The pivots 26 are mounted in lugs 28 of the spider 25. The spider 25 is secured to shaft 18 by set screws 29.

Rollers 17 preferably are made hollow so that a cooling fluid may be passed therethrough. Thus the rollers have internal passages 17b to which are connected cooling air pipes 31 at the rear ends of the rollers which pipe may be provided with valves 32 to regulate the flow of cooling air through the rollers. Holes 17c are provided in the front ends of the rollers, as shown in Fig. 6, for the escape of the cooling air from the internal passages 17b.

In order to rotate the rollers a double pulley 33 is mounted on the end of each of them as shown in Figs. 1, 2 and 3. These pulleys are engaged by belts which drive the rollers, there being two belts 34 and 35. The belt 34 engages the outermost of the double pulleys on the top and bottom rollers and on the two inside rollers and the belt 35 engages the innermost pulleys on the top and bottom rollers and on the two outside rollers. See particularly Fig. 3 which shows this engagement of the belts with the rollers and the extension of the belts 35 and 35 to opposite sides of the roller assembly. Thus the belt 34 passes around one part of a double pulley 36 on shaft 37 in supports 38 and 39, the other part of the pulley 36 being engaged by a belt 41. The belt 41, in turn, is driven by a double pulley 42 engaged by a belt 43, which in turn is driven from a double pulley 44 of reduction gear 45. Reduction gear 45 receives power through a belt 46 taken off a speed change device 47 driven by a motor 48.

Similarly belt 35 passes around a double pulley 51 in supports 52 and 53, Figs. 2 and 3, which pulley in turn is driven by a belt 54 from double pulley 55 receiving power through a belt 56 engaging the double pulley 44.

Through the driving means thus provided the rollers may be driven at the desired speed all in the same direction, as for example in a counter-clockwise direction as indicated by the arrows on the rollers in Figs. 1, 2 and 3.

A wheel 58 preferably is employed to press together the winding of the plastic strip where it wraps onto the rollers 17 which constitute internal forming means. The wheel is mounted on a vertical support 59 at the ends of the horizontal rods 61 on the support and in such a vertical position as to apply the desired pressure to the plastic without unduly deforming it. Preferably air is directed against the wheel, as through a pipe 62, to cool it and thus prevent the wheel from sticking to the plastic material. The tube or tubing 63 preferably is supported to hold it in alignment with the internal forming means and for this purpose there may be provided a pair of rollers, one of which is shown at 64, on supports 65 mounted on the table 21, rollers 64 supporting the tubing on opposite sides and permitting it to turn and to slide lengthwise with a minimum of resistance.

In carrying out the novel method with the apparatus of the invention, the ribbon 14 is extruded and wrapped around the rollers 17 until in frictional engagement therewith and the formation of a tube is started. The rotation of the rollers applies the desired tension to the strip or ribbon 14 to draw it and thus cause it to be molecularly oriented, the relative rates of extrusion and speed of rotation of the rollers being so controlled as to bring about this result.

The rollers are driven at such a speed and the ribbon is extruded at such a rate as to cause the ribbon or strip to be wound around the rollers with the desired amount of overlap in order that tubing of the desired wall thickness will be formed. The amount of overlap might be widely varied and either a thin walled tube or a thick walled tube produced, the greater the amount of overlap the thicker the tubing.

The ribbon or strip of plastic material will be at such a temperature that it will be coalesced into a non-lamellar mass, this coalescence usually being assisted by the pressure of the wheel 58, as mentioned above. This will be true even though the material will be at a sufficiently low temperature and high viscosity to permit it to be highly oriented and to retain a large amount of orientation in the time necessary to form the tubing and to cool it to a point where orientation cannot be relaxed.

As the tubing is wound, it is caused to move to the right, looking at Figs. 1 and 2, by the converging relation of the rotating rollers 17, that is, by their approximately conical arrangement. This action may be assisted by skewing the rollers 17 so that their axes all pass to one side of the true axis of the cone, the rollers all being skewed in the same direction. The rollers are so shown in Fig. 3.

Fig. 7 shows the manner in which a number of layers of the ribbon or strip 17 may be built up initially to start the forming of the portion 63a of the tubing 63. It will be seen from this figure that the tubing has flat sides, being hexagonal in shape. At this stage in the method, the plastic material will still be sufficiently hot to be elastic and to permit some relaxation of orientation which keeps it under tension and causes the tubing to ride along the rollers. As the tubing moves along over the rollers the distance between the rollers 17 decreases and this relieves the tension somewhat while the plastic material is cooling and its ability to relax is lessened but relaxation and contraction continue.

The rollers will be internally cooled at a predetermined rate to accelerate the cooling of the plastic material and as the tubing moves along it tends to contract and gradually to assume a circular shape, roughly as shown at 63b in Fig. 8. At some point in the travel of the tubing over the rollers, predetermined by the rate of cooling, the tubing attains enough stiffness to be self-supporting and becomes circular in cross section and automatically moves off of and is freed from the rollers, this point being indicated approximately at 66, Fig. 2. The final truly circular cross section of the tubing is shown at 63c, Figs. 3 and 9.

It will be seen that the tubing may be formed continuously, the rotation of the tubing by the rollers 17 serving to draw the ribbon 14 from the nozzle, the angle between the rollers, the speed at which they are driven, and the rate of extrusion being so controlled and coordinated as to form the tubing of the desired diameter and wall thickness.

In this way tubing of unusual strength may be made, a large amount of orientation of the plastic being retained, and at the same time the tubing made of non-lamellar structure as the result of the welding together of the wrappings of the ribbon or strip. The edges of the ribbon which remain on the inside or outside of the tubing or cylinder may be removed by machining, if desired.

Having thus described my invention, what I desire to claim and secure by Letters Patent is:

1. The method of forming tubing of organic plastic material which comprises feeding a heated strip of such material to, and drawing and spirally wrapping said strip on, a group of rollers arranged approximately in the form of a cone, welding together the turns of said strip to form integral tubing initially having a polygonal shape in cross section, moving the tubing along the rollers while cooling it, and forming the tubing into circular shape and moving it out of contact with the rollers.

2. The method of forming tubing of organic plastic material which comprises drawing a strip of such material under such conditions of temperature and viscosity as to cause it to be molecularly oriented, spirally wrapping said strip around a group of rollers arranged approximately in the form of a cone, rotating said rollers to cause the tubing thus formed to move along them, and gradually cooling the tubing during its travel along the rollers and causing it to move out of contact with the rollers in circular form.

3. The method of forming tubing of organic plastic material which comprises drawing and molecularly orienting a strip of such material and spirally winding the strip into a tube by wrapping it around a group of rollers arranged approximately in the form of a cone and driving the rollers and cooling the material as it moves over the rollers.

4. The method of forming tubing of organic plastic material which comprises drawing a strip of organic plastic material at such a temperature and viscosity as to molecularly orient it, wrapping the strip around a group of rollers arranged about an axis in diverging relation, pressing together the turns of said strip on the rollers to cause them to be welded into an integral non-lamellar mass, rotating the rollers, and cooling the tubing during its travel along the rollers.

5. The method of forming a tube of organic plastic material which comprises drawing a strip of such material to molecularly orient it, initially forming said strip into a tube of polygonal cross section by wrapping it spirally around a group of conically arranged rollers, rotating the rollers to cause the tubing to move over them, and changing the cross sectional shape of the tubing from poylgonal to circular by contracting the tubing as it moves over said rollers and cooling the tubing to harden it in circular shape.

6. Apparatus for forming tubing of organic plastic material comprising means for extruding such material in the form of a strip at a temperature and viscosity at which said material can be molecularly oriented by drawing, a group of rollers, means for rotating said rollers to draw said strip and to spirally wind it into the form of a tube, means for cooling said tube, and means supporting said rollers in conical arrangement to cause the tubing to be moved along and off of said rollers as it is cooled by said cooling means.

7. Apparatus for forming tubing from molecularly oriented organic plastic material comprising a group of rollers, means for supporting said rollers approximately in the form of a cone, and means for rotating said rollers.

8. Apparatus for forming tubing from molecularly oriented plastic material into a tube comprising a group of rollers arranged approximately in the form of a cone, means for adjusting the angular relation of said rollers to the axis of said cone, and means for rotating the rollers.

9. Apparatus for forming a strip of molecularly oriented organic plastic material into a tube which comprises a group of rollers arranged approximately in the form of a cone, means for rotating said rollers comprising double pulleys on the ends thereof, and a pair of belts one engaging some of said pulleys and the other engaging some only of the first named pulleys and others of said pulleys.

10. Apparatus for forming a strip of organic plastic material into tubing which comprises means for extruding said strip, and means for drawing said strip and spirally winding it into the form of a tube comprising a group of rollers, means for rotating said rollers at such a speed relative to the rate of extrusion of said strip as to draw and molecularly orient said strip while spirally winding it into the form of a tube, means for cooling said tube, and means for holding such rollers in such angular relation as to cause the tube to move along and off of said rollers as it is cooled by said cooling means.

JAMES BAILEY.